United States Patent
Xue et al.

(10) Patent No.: US 10,178,394 B2
(45) Date of Patent: Jan. 8, 2019

(54) TRANSCODING TECHNIQUES FOR ALTERNATE DISPLAYS

(71) Applicant: Apple Inc., Cupertino, CA (US)

(72) Inventors: Jingteng Xue, Santa Clara, CA (US); Yeping Su, Sunnyvale, CA (US); Chris Chung, Sunnyvale, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 238 days.

(21) Appl. No.: 15/179,728

(22) Filed: Jun. 10, 2016

(65) Prior Publication Data

US 2017/0359586 A1    Dec. 14, 2017

(51) Int. Cl.
| | |
|---|---|
| *H04N 19/167* | (2014.01) |
| *H04N 19/70* | (2014.01) |
| *H04N 19/40* | (2014.01) |
| *H04N 19/44* | (2014.01) |

(52) U.S. Cl.
CPC .......... *H04N 19/167* (2014.11); *H04N 19/40* (2014.11); *H04N 19/44* (2014.11); *H04N 19/70* (2014.11)

(58) Field of Classification Search
CPC ...... H04N 19/167; H04N 19/40; H04N 19/44; H04N 19/70; H04N 21/2343
USPC .......................................................... 375/240
See application file for complete search history.

(56) References Cited

U.S. PATENT DOCUMENTS

| | | | | |
|---|---|---|---|---|
| 6,411,333 B1* | 6/2002 | Auld | .......................... | G06T 3/40 |
| | | | | 348/441 |
| 6,677,979 B1* | 1/2004 | Westfield | ................. | H04N 7/15 |
| | | | | 348/14.08 |
| 6,757,008 B1* | 6/2004 | Smith | .................... | H04N 5/225 |
| | | | | 348/143 |
| 2004/0223058 A1* | 11/2004 | Richter | .................... | H04N 5/77 |
| | | | | 348/207.1 |
| 2005/0078220 A1* | 4/2005 | Sullivan | .................. | H04N 7/08 |
| | | | | 348/565 |
| 2005/0213833 A1* | 9/2005 | Okada | .................... | G06F 3/1431 |
| | | | | 382/240 |
| 2007/0076957 A1* | 4/2007 | Wang | ................. | G06K 9/00234 |
| | | | | 382/195 |
| 2008/0043832 A1* | 2/2008 | Barkley | ......... | H04N 21/234327 |
| | | | | 375/240 |
| 2009/0022412 A1* | 1/2009 | Okada | .................. | H04N 19/172 |
| | | | | 382/240 |

(Continued)

*Primary Examiner* — Marnie A Matt
(74) *Attorney, Agent, or Firm* — Baker & Hostetler LLP (57) ABSTRACT

Video coding techniques are disclosed for resource-limited destination display devices. Input video data may be coded by converting a first representation of the input video to a resolution of a destination display and base layer coding the converted representation. Additionally, a region of interest may be predicted from within the input video. The predicted ROI may be converted to a resolution of the destination display, and the converted ROI may be enhancement layer coded. The base layer coded data and the enhancement layer data may be transmitted to the destination display where the coded base layer data is decoded and displayed until a zoom event occurs. When a zoom event occurs, both the coded base layer data and the coded enhancement layer data may be decoded and displayed. Thus, the switchover from a first field of view to an ROI view may be performed quickly.

28 Claims, 6 Drawing Sheets

(56) References Cited

U.S. PATENT DOCUMENTS

| | | | | |
|---|---|---|---|---|
| 2009/0154816 A1* | 6/2009 | Swazey | .................. | H04N 19/61 |
| | | | | 382/232 |
| 2012/0179833 A1* | 7/2012 | Kenrick | ......... | H04N 21/234309 |
| | | | | 709/231 |
| 2013/0265322 A1* | 10/2013 | Tsujimoto | ................ | G09G 5/14 |
| | | | | 345/589 |
| 2014/0280679 A1* | 9/2014 | Dey | .................... | H04L 67/2842 |
| | | | | 709/213 |
| 2015/0304665 A1* | 10/2015 | Hannuksela | ........... | H04N 19/70 |
| | | | | 375/240.02 |
| 2015/0326865 A1* | 11/2015 | Yin | ........................ | H04N 19/46 |
| | | | | 375/240.13 |
| 2015/0373341 A1* | 12/2015 | Davies | ................. | H04N 19/187 |
| | | | | 375/240.02 |
| 2016/0255354 A1* | 9/2016 | Yamamoto | ............. | H04N 19/70 |
| | | | | 375/240.12 |
| 2016/0316219 A1* | 10/2016 | Yuan | .................... | H04N 21/435 |

\* cited by examiner

TRANSCODING TECHNIQUES FOR ALTERNATE DISPLAYS

BACKGROUND

The present disclosure relates to video coding and, in particular, to coding techniques that find application in resource-limited devices.

Video processing and rendering systems are deployed in an ever-widening array of consumer electronic devices. Initially, such systems were the province of dedicated processing equipment but, over time, such systems found application in personal computing environments, tablet computing and smartphone environments and, more recently, smart watch environments. Smart watches tend to have less computational resources than smartphones and smartphones tend to have less computational resources than personal computers. While modern video coding protocols may employ processing techniques that are appropriate for one type of processing device (say, a personal computer or smartphone) these same techniques may be too complex for another type of processing device (say, a smart watch).

Similarly, display characteristics may vary widely from device to device. A personal computer or tablet computer may utilize displays that are far larger than their smart watch counterparts. A coded video stream that has sufficient image content to drive a display on a tablet computer may have far too much data to drive a display on a smaller smart watch. Image content may have to be rescaled to be displayed on the smart watch. However, the smaller display size of a smart watch may cause viewers to zoom in and out of displayable video, and, as a consequence, image data that would not be displayed if an entire field of view of image data were shown may be required at a moment's notice in response to a zoom event. Additionally, smart watches and other devices may receive coded video over bandwidth-constrained communication links, which further constrain the devices' capacity to receive and decode coded video.

Accordingly, the inventors have identified a need in the art for a coding system that codes video data in a manner that uses communication bandwidth effectively and responds quickly to zoom events at a destination device that may communicate with the coding system notwithstanding communication latencies between the coding system and its display device.

DETAILED DESCRIPTION

Embodiments of the present disclosure provide coding and decoding techniques for display devices. Input video data may be coded by converting a first representation of the input video to a resolution of a destination display and base layer coding the converted representation. Additionally, a region of interest may be predicted from within the input video. The predicted ROI may be converted to a resolution of the destination display, and the converted ROI may be enhancement layer coded. The base layer coded data and the enhancement layer data may be transmitted to the destination display.

At the destination display's location, the coded base layer data and coded enhancement layer data may be received. The coded base layer data may be decoded and displayed until a zoom event occurs. When a zoom event occurs, both the coded base layer data and the coded enhancement layer data may be decoded and displayed. Thus, the switchover from a first field of view to an ROI view or the reverse may be performed quickly, without incurring latencies that might arise from round trip communication between the coder and the destination display.

Figure 1:
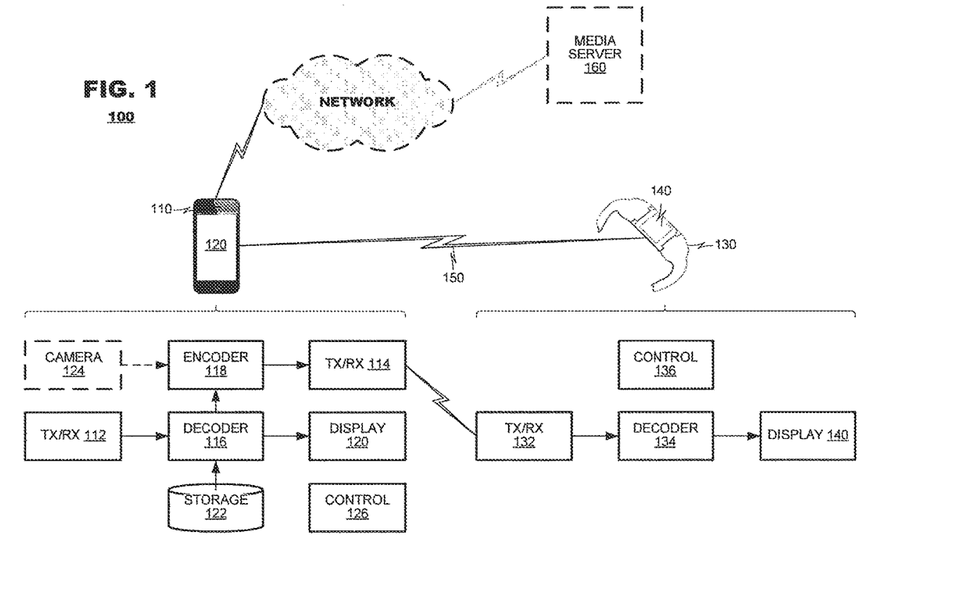
FIG. 1 illustrates a system according to an embodiment of the present disclosure.

FIG. 1 illustrates a system 100 according to an embodiment of the present disclosure. The system 100 may include first and second terminals 110, 130 that are provided in mutual communication via a communication path 150. The first terminal 110 may include a video coding and rendering system and a local display 120. The second terminal 130 also may include a video coding and rendering system and a local display 140. The display 140 of the second terminal 130 may have different display characteristics than the display 120 of the first terminal 110; typically, but not always, the display of the second terminal 130 will have smaller dimensions and different resolution than the display 120 of the first terminal 110. For example, the first terminal 110 may be provided as a first electronic device such as a portable media player, smartphone or tablet computer. The second terminal may be provided as a second electronic device, such as another smartphone, another tablet computer, a smartwatch, virtual reality goggles, augmented reality goggles, automotive media system, and aircraft media system.

FIG. 1 presents a simplified functional block diagram of units within the coding and rendering system of the first terminal 110. It may include one or more transceivers 112, 114, a decoder 116, an encoder 118, the local display 120, a local storage system 122, a camera 124 (optionally), operating under control of a controller 126. The transceivers 112, 114 may provide communication interfaces that permit the first terminal 110 to communicate with other media devices, such as the second terminal 120 and media servers(s) 160. Although separate transceivers 112, 114 are illustrated in FIG. 1, in practice, a single transceiver may be sufficient to suit individual application needs based on the network(s) through which communication is desired.

The decoder 116 may decode coded video data that is input to it, either through one of the transceivers 112 or from storage 122. For example, in media streaming applications, the decoder 116 may decode coded video data that is presented to it from a media server. In media download applications, coded media data may be presented to the device from a storage system or it may be downloaded at some earlier time and stored for later decode. Decoded video data may be output by the decoder 116 to the display 120.

In an embodiment, the first terminal 110 may code data for delivery and display by the second terminal 130. Coded data may be generated in several different applications, which may include both real-time coding and store-and-forward coding applications. For example, real-time coding may be required in circumstances where data represents "live" media content, which is to be delivered to the second terminal 130 and displayed with as little latency as possible. Such circumstances may occur where a network media source (for example, a media server 160) streams live media content to the first terminal in coded form, which is decoded, recoded and transmitted to the second terminal 130. Real time coding may be required for media content generated locally at the first terminal 110, for example, video data generated by a camera 124 or video data generated by applications (not shown) executing on the first terminal 110. Store and forward coding may occur in circumstances, for example, where media content is stored to the first terminal 110 well in advance of coding, then retrieved from storage 122, coded and delivered to the second terminal 130. The principles of the present disclosure find application with any of these scenarios.

The encoder 118 may code video data from an input source (for example, the decoder 115, storage system 122 or camera 124), according to a protocol that is supported by the second terminal 130. The encoder 118 may output coded video data to a transceiver 114, which may transmit the coded video data to the second terminal 130.

The second terminal 130 may include a transceiver 132, a decoder 134, the second display 140, operating under control of a controller 136. The second terminal 130 may receive coded video data from the first terminal 110, decode it and render recovered video obtained therefrom on the second display 140. The second terminal 130 may execute a variety of application programs under control of the controller 136, through which the second terminal 130 accepts user commands and executes them. As is relevant to the present discussion, the second terminal 130 may execute video rendering applications, gaming applications and the like, through which the second terminal renders coded video data.

According to an embodiment, a first terminal 110 may code video data according to display characteristics of the second terminal's display 140. The first terminal 110 may code a variety of representations of the video data for the second terminal 130 and, in doing so, may attempt to predict different viewing modes that may be employed at the second terminal 130. In an embodiment, the first terminal 110 may employ scalable video coding to code these representations and, in doing so, the first terminal 110 may utilize scalable video coding (SVC) extensions to the coding protocol at work between the first and second terminals 110, 130. The H.264 and H.265 coding protocols both define such SVC extensions, which may be used cooperatively with the techniques described hereinbelow.

Figure 2:
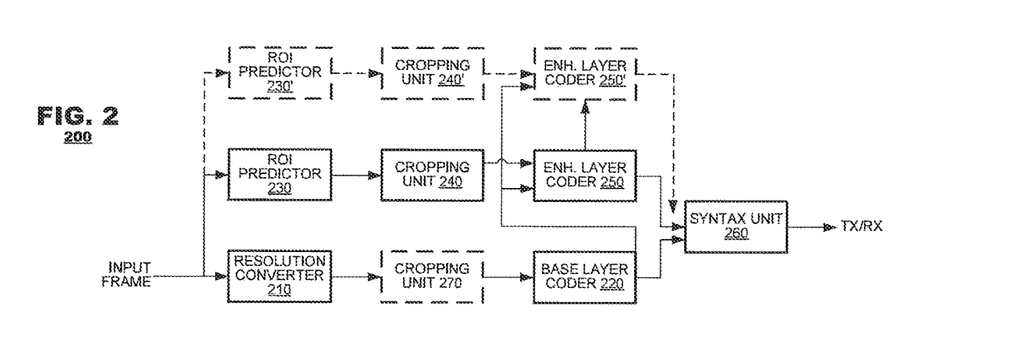
FIG. 2 illustrates a functional block diagram of a coding system according to an embodiment of the present disclosure.

FIG. 2 illustrates a functional block diagram of a coding system 200 that may be applied at a first terminal 110 (FIG. 1) according to an embodiment of the present disclosure. The coding system 200 may include a resolution converter 210, a base layer coder 220, a region of interest (ROI) predictor 230, a cropping unit 240, an enhancement layer coder 250 and a syntax unit. The resolution converter 210 and base layer coder 220 may cooperate to code a first representation of the video data to be transmitted to the second terminal 130 (FIG. 1). The ROI predictor 230, cropping unit 240 and enhancement layer coder 250 may cooperate to code a second representation of the video data to be transmitted to the second terminal 130. Although in practice, it may be sufficient to code only two different representations of the video for the second terminal 130, the principles of the present disclosure may be extend to code additional representations of video, in which case the first terminal 110 may include additional instances of the ROI predictor 230', cropping unit 240' and enhancement layer coder 250'. For convenience, the present discussion describes a coding scenario in which only two representations of the video are coded.

In an embodiment, the coding system 200 may code a base representation of the input video as base layer coded data. The resolution converter 210 may convert resolution of input data as necessary to conform resolution of the input video to the display resolution of the second terminal 130 (FIG. 1). Thereafter, the base layer coder 220 may code the input video as base layer coded video, according to coding techniques that are defined by the governing coding protocol.

Typically, a base layer representation of the input video will code the input video in its entire field of view. In some scenarios, however, display characteristics of the second terminal's display 140 (FIG. 1) may warrant cropping of the input video to match the display 140. Thus, the input video also may be cropped to fit the second terminal's display by a cropping unit 270. In an embodiment, the system 200 may rescale image data that is selected for base layer coding in response to a zoom event.

The second representation of the video may represent a portion of the coded video data that can be predicted as having high interest for a viewer. The ROI predictor 230 may predict regions within the image data that are likely to have viewer interest. The cropping unit 240 may crop input image data to the region that is identified as a region of interest. Thereafter, the enhancement layer coder may code the cropped video data as enhancement layer data, again according to coding techniques that are defined by the governing coding protocol.

The syntax unit 260 may merge coded base layer data and coded enhancement layer data into a bit stream that confirms to the coding protocol. The syntax unit 260 may output the resultant bit stream to a transceiver (FIG. 1) for transmission to the second terminal.

The resolution converter 210 also may adapt input content to a content format with higher chroma subsampling rate to preserve color information, which may involve scaling image content different for different color components. For example, the resolution converter 210 may scale chroma-subsampled 4:2:0 input video at high resolution to 4:4:4 format video at lower resolution. Two stage scaling may be used, which first upscales source chroma (or downscale source luma) to generate 4:4:4 video at an intermediate resolution, then down-samples luma and chroma components of the intermediate resolution data for final output. In applications where the output resolution is smaller than source chroma resolution, the source luma plane may be down-sampled first. In applications where the output resolution is larger than source chroma resolution, the source chroma planes may be up-sampled first to interpolate chroma values at corresponding luma locations. A non-linear adaptive filter may be used to exploit luma-chroma correlation.

Additionally, scaling can be encoding rate adaptive. The non-linear upscaling/downscaling filters can be motion complexity adaptive, which may smooth out chroma texture in fast motion scenes for better luma coding. In case of missing chroma siting info, the chroma location can be approximated by comparing correlation with interpolated luma component data.

In an embodiment, when a ROI is dynamically reset by a zoom event, a base layer coder 220 can encode a full picture but allocate more bits for the selected ROI. A base layer coder may perform quantization parameter (QP) modulation that assigns high QP values for non-ROI regions and uses the rest of the bit budget for coding a selected ROI. In response, the second terminal 130 may decode the entire coded picture but crop the decoded picture to the ROI which is displayed.

For dynamically selected ROIs, a coder may select a region slightly bigger than the ROI for high quality coding (relatively low QP), with smooth QP transitions between the ROI region and the outer regions of image content. In this manner, if a user zooms out from the ROI, the second device may instantly provide displayable content of the zoomed out region with relatively high quality content while waiting for the coding system 200 to update its coding rates.

For dynamically selected ROIs, when zoom events occur, the coder can scale the source image data in a base layer to fit to the selected ROI. The coder and decoder also may scale locally-stored reference frame data for use in prediction of later coded image data.

In another embodiment, the coders 220, 250, 250' may include pre-processing stages (not shown) that can adaptively filter source ROI region according to the output resolution with smaller outputs triggering more filtering. The preprocessing stage can also filter the texture outside the ROI to reduce rate and coding artifacts that may arise from application of high QP values.

A pre-processing filter removes noise, blurs texture and motion according to a specific display to facilitate video encoding at low resolution and low data rate. Input samples may be parsed into patches. For each patch, a motion search is performed between the patch and its temporal neighbors to identify a similar patch from another frame. The search may generate a motion vector while the matched patches are aligned as a 3D tube. The tube is transformed and quantized to compress high spatiotemporal frequency information. The filtered coefficients are then de-quantized and inverse transformed for output.

A quantization matrix is derived from STCSF (spatiotemporal contrast sensitivity function). Given a motion vector, target display size and pixel density, the transform domain coefficient indices may be translated to actual viewing signal frequency. By looking up STCSF values, a quantization matrix is derived. This matrix reflects the level of visual significance for the target display. The quantization matrix can be further tuned given the brightness and texture level (masking effects). Alternatively, a quantization matrix can also be adjusted in response to device sensor data. For example, a high level of device motion will trigger a low resolution and low quality encoding.

Each coder 220, 250, 250' may operate according to a bit rate budget, which defines a target bit rate for each respective coder. In an embodiment, given a target rate and a desired quality level, each coder 220, 250, 250' may output a bit stream with minimal rate (could be significantly smaller than the target rate) that reaches the directed quality level. In the case that the desired quality level cannot be reached within the given target rate, the respective coder 220, 250, 250' may code its input data at the target rate.

During encoding, for each pixel block, each coder 220, 250, 250' may estimate a visual quality QP (VQQP) value from content analysis of the data being coded. This VQQP will generate coded video data that meets the desired quality level. Meanwhile, the same pixel block may be subject to rate control processing, which estimates a rate controlled QP (RCQP) that is needed to achieve desired data rate. The coders 220, 250, 250' may select the higher value between the VQQP and the RCQP value as the final QP for coding the pixel block.

For simple clips, auto minimal rate encoding can reduce rate without sacrificing quality. For complexity fluctuating clips, auto minimal encoding saves bits at simple scenes and improve quality for hard ones.

In an embodiment, coders 220, 250, 250' may perform resolution adaptive encoding. Input video may be parsed into scenes. For each scene, a resolution converter may scale the image data to multiple resolutions and compute visual information loss due between each resolution tier. A coder 220 may encode the scene at each of these resolutions, measure output rate and coding quality. Based on these measurements, a coder 220 may develop a data model that relates resolution, rate and quality for each scene. The coder 220 may select an optimal resolution and rate of each scene to hit the desired target data rate while optimizing the overall quality.

Visual information loss may be computed as follows: first upscale to match source resolution, and then compute transform domain distortion energy. The error energy of each coefficient may be weighted by the visual significance of its viewing frequency given the display size at the secondary display 140. A contrast sensitivity function ("CSF") table may be used for looking up the frequency to weight mapping. The sum of the weighted error energy indicates the level of visual information loss. Scene end-to-end quality may be estimated as the weighted sum of a coding error metric (peak signal-to-noise ratio (PSNR)/structural similarity index models (SSIM)), coding artifacts estimation, and visual information loss. The overall video quality may be derived as a weighted sum of average scene quality and minimal scene quality. A higher score indicates better and more consistent viewing experience. To reduce complexity, a pre-encoder may encode limited samples of a scene to construct the rate-distortion model.

Figure 3:
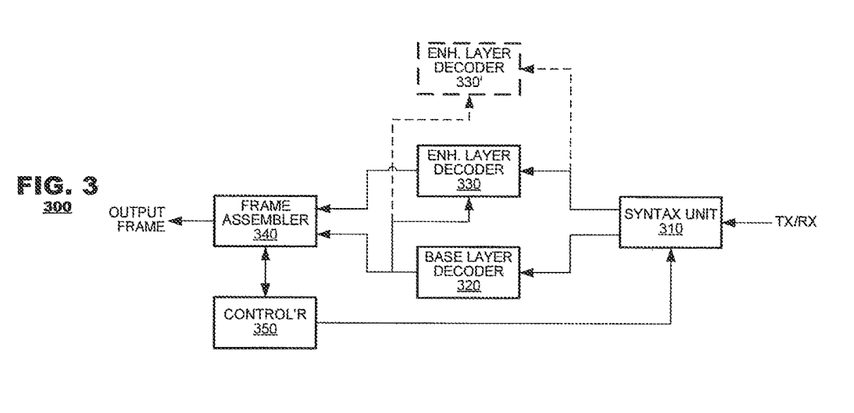
FIG. 3 illustrates a functional block diagram of a decoding system according to an embodiment of the present disclosure.

FIG. 3 illustrates a functional block diagram of a decoding system 300 that may be applied at a second terminal 130 (FIG. 1) according to an embodiment of the present disclosure. The system 300 may include a syntax unit 310, a base layer decoder 320, one or more enhancement layer decoders 330, 330', and a frame assembler 340, operating under control of a controller 350.

The syntax unit 310 may parse a coded video bit stream into its constituent parts and route coded data to respective decoder. As part of this operation, the syntax unit 310 may route coded base layer data to the base layer decoder 320, and it may route coded enhancement layer data to appropriate enhancement layer decoder(s) 330, 330'. The base layer decoder 320 may decode coded base layer data according to the techniques defined by the coding protocol; it may output decoded video data therefrom. Similarly, the enhancement layer decoder(s) may decode coded enhancement layer data, again according to techniques defined by the coding protocol. Each decoder 320, 330, 330' may output decoded video data representing the input data that was coded by its counterpart coders 220, 250, 250' in the coding system 200 (FIG. 2).

The frame assembler 340 may generate final output frames to be displayed by the second terminal 130 (FIG. 1). The frame assembler 340 may select video data output from one or more of the coders to be displayed as determined by the controller 350. The controller 350, in turn, may direct selection of output video as determined by application controls and/or user control.

In an embodiment, the controller 350 may disable certain enhancement layer decoders 330, 330' dynamically during operation of the system. For example, if the controller 350 determines that decoded enhancement layer data will not be used in display output, then the controller 350 may disable the unused enhancement layer decoders.

Figure 4:
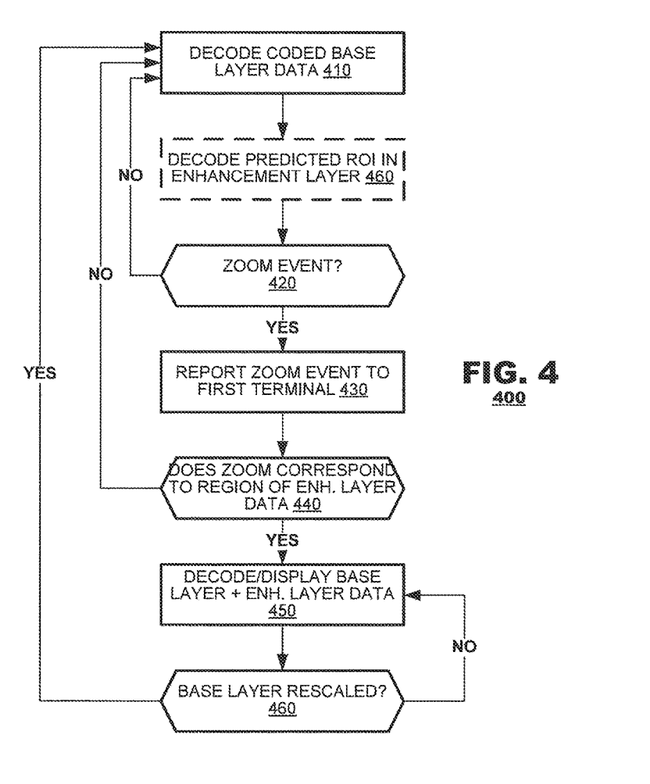
FIG. 4 illustrates a method of decoder operation according to an embodiment of the present disclosure.

FIG. 4 illustrates a method 400 of decoder operation according to an embodiment of the present disclosure. The method 400 may be performed to govern selection of coded video output by base layer decoders and enhancement layer decoders. The method 400 may begin by decoding coded base layer data (box 410) and determining whether a zoom event occurred (box 420). The method 400 may cycle between operations identified in boxes 410 and 420 until a zoom event occurs.

When a zoom event occurs, the method 400 may cause the zoom event to be reported to the first terminal (box 430). The method 400 may determine whether the requested zoom event relates to a region of displayable content represented by the enhancement layer (box 440). If so, the method may decode base layer data and the enhancement layer data that corresponds to the zoomed region and display it (box 450). The method 400 may do so until it receives an indication that the base layer data was rescaled to correspond to the region of the zoom event (box 460).

Figure 5:
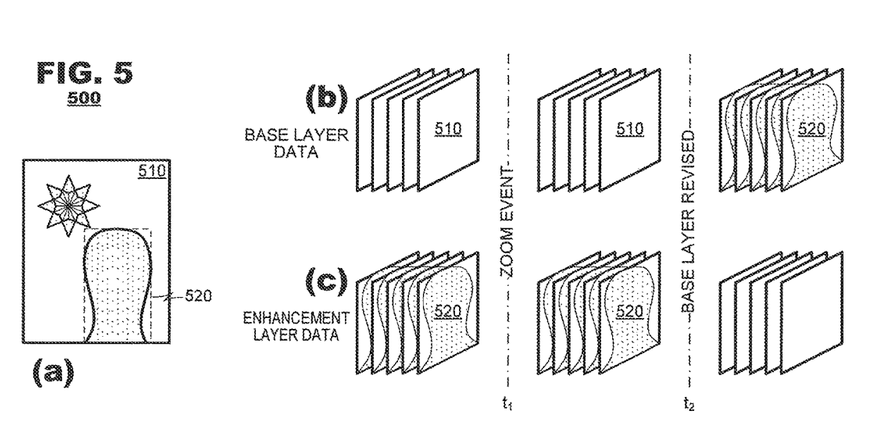
FIG. 5 illustrates exemplary operation of the method of FIG. 4 according to an embodiment of the present disclosure.

FIG. 5 illustrates exemplary operation of the method 400 according to an embodiment of the present disclosure. FIG. 5(a) illustrates an exemplary frame 510 that includes a predicted ROI 520. FIG. 5(b) illustrates exemplary base layer data across a video sequence and FIG. 5(c) illustrates exemplary enhancement layer data. In this example, there is minimal variation of image content within a video sequence so that all frames in the sequences illustrated in FIGS. 5(b) and 5(c) have the same content.

FIGS. 5(b) and 5(c) illustrates a series of coded frames before a zoom event occurs at time $t_1$, between the time that the zoom event occurs and a time $t_2$ at which the base layer data is revised, and after the time $t_2$ the base layer data is revised. Before the zoom event occurs at time t1, the method 400 may decode a full representation of the frame 510 as base layer data and it may decode the predicted ROI 520 as enhancement layer data. The method 400 may decode the full representation of the frame 510 as base layer data for some time following the zoom event at t1, owing to communication latencies that may occur between the first and second terminals 110, 130 (FIG. 1). Nevertheless, the method 400 may decode and display both the base layer data and the enhancement layer data starting at time t1, which permits higher-quality decoded data to be displayed than would be possible using coded base layer data alone. At some point, shown at time t2, the base layer data may be rescaled to meet the display configuration that was selected by the zoom event. In this example, the base layer data is revised to contain the selected ROI 520. The method 400 may revert back to decode of the base layer data.

When the base layer data is scaled according to settings defined by the zoom event, an ROI predictor 230 (FIG. 2) is free to predict other ROIs from image content and provide coded image data of the newly-predicted ROI in the enhancement layer data. The new ROIs may represent, for example, a wider field of view of the input frames or they may represent content from other portions of input frames. Thus, when the method 400 returns from box 460 to box 410, the enhancement layer data will support another quick switchover of displayable content in response to a new zoom event.

Zoom events typically can be entered at the second device 130 in a variety of ways. In a touch screen application, a user may interact with a touch screen (part of the display 140) of the device 130 to enter pinch or drag commands that scale displayable content. Alternatively, a user may interact with buttons or softkeys on the device that represent commands to scale content in predetermined says (e.g., full screen, zoom in/out, etc.)

Figure 6:
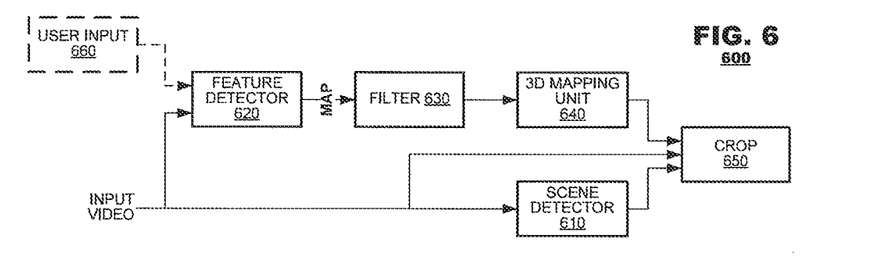
FIG. 6 illustrates an ROI predictor according to an embodiment of the present disclosure.

FIG. 6 illustrates an ROI predictor 600 according to an embodiment of the present disclosure. The ROI predictor 600 may include a scene detector 610, a feature detector 620, a filter unit 630, a 3D mapping unit 640, and a cropping unit 650. The scene detector 610 may detect scene changes within input video and may reset the predictor 600 at each scene. The feature detector 620 may detect features from within image content that may correspond to regions of interest. The filtering unit 630 may filter output from the feature detector 620, which may remove detected features that have short temporal durations or limited spatial size within image data. The 3D mapping unit 640 may connect detected features to form three-dimensional ROI cropping objects (called "blobs" for convenience), along spatial and temporal directions in a video sequence. Finally, the cropping unit 650 may crop input image data according to dimensions of the blobs. The cropped image data may be coded as predicted ROIs.

As indicated, the feature detector 620 may identify ROI candidates from image data. The feature detector 620 may identify ROI candidates, for example, by face detection, object detection or the like. The feature detector 620 may identify ROI candidates based on a discrimination of foreground content from background content in image content. Alternatively, the feature detector 620 may identify ROI candidates based on motion of content within a field of view or by a detection of image content that moves in a manner contrary to a general direction motion identified in image content. Further, the feature detector 620 may identify ROI candidate based on location of content (for example, content in a center area of an image may be selected as an ROI over content toward an image edge). The feature detector 620 may output a feature map that identifies image locations where ROI candidate are detected.

In an embodiment, elements of the feature map may be weighted by factors such as the visual significance of each detected feature, feature type, a feature's detected size or location, and a confidence score assigned to the detected feature. Each image element, for example a pixel, pixel block or other unit, may have a weight score that represents a sum of the weights derived from the feature detection.

The filtering unit 630 may filter the feature maps from the feature detector 620. The filtering unit 630 may apply one or more filters to the feature maps such as scaling, de-noising, and/or smoothing filters. The filter(s) may connect dominant features within the map and may reduce or eliminate less significant features. For example, the filter(s) may remove spatially- or temporally-isolated small features, which may represent insignificant features or noise, and they may remove features with small weight assignments, favoring other features with larger weight assignments.

The 3D mapping unit 640 may build a blob from among the filtered data output by the filtering unit 630. The 3D mapping unit 640 may connect the filtered mapping data on a frame-by-frame basis, which effectively creates a model of the mapping data along three dimensions: x and y dimensions may represent spatial locations of each frame that are occupied by the mapping data, and a t dimension may represent locations of the mapping data temporally. The 3D mapping unit 640 may detect an object volume occupied by the mapping data (essentially, a blob). From the blob, the 3D mapping unit 640 may define a trapezoidal prism that circumscribes the blob. Coordinates of the prism may define cropping windows for the frames represented by the blob.

Figure 7:
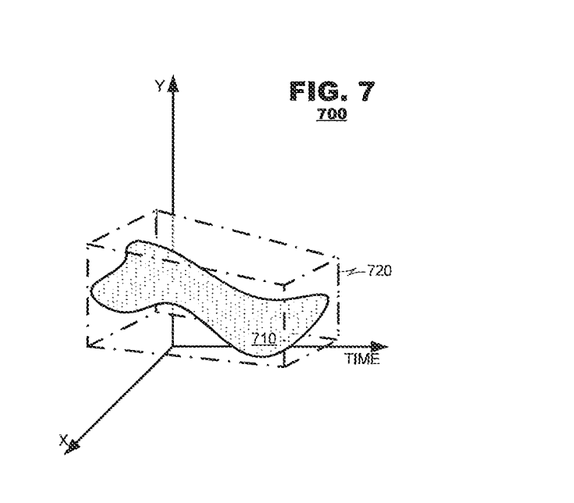
FIG. 7 schematically illustrates exemplary operation of an ROI predictor.

FIG. 7 schematically illustrates an exemplary mapping process. Concatenation of the detection maps output by the filtering unit 630 may define a block 710 that represents a volume occupied by the detected features over time. A trapezoidal prism 720 may be defined to surround the blob 710. Dimensions of the prism in each frame may define a cropping window for that frame.

In an embodiment, cropping windows may be defined not only to contain the ROIs but also fit target aspect ratio of the display 140 (FIG. 1) on which the ROI will be displayed. Additionally, cropping windows may be defined after consideration of aesthetic cues that can be detected from image content and encoding cost of the cropped data. For example, aesthetic cues may include a set of rules (e.g. rule of thirds) to apply after analysis of image data. Alternatively, the aesthetic cues may be data driven, for example by comparing statistics of image data that will be obtained by candidate cropping windows to a statistics of other videos that have been previously-classified as having good aesthetic characteristics.

Consideration of encoding cost can be effective when the output data rate of the coded enhancement layer is limited. The ROT predictor 600 may adjust a cropping window to facilitate encoding at a target data rate. For example, a feature detector may analyze pixel blocks of input video, analyze their complexity and estimate its encoding cost given a specific output size. A controller 126 (FIG. 1) may perform pre-encoding to provide reference data. Then the ROI predictor may estimate a proper size of the ROI. If the ROI size is smaller than the size of the display 140, the 3D mapping unit 640 may search around ROI for an optimal cropping window. In some circumstances, if the output rate is very low, a final cropping window may be set to be larger than the ROI, to cause the ROI to have reduced size in the cropped image, which omits fine details of the ROI content. The ROI center may be moved towards a direction with simpler background texture, which would have lower coding cost.

Returning to FIG. 6, in an embodiment, the ROT predictor 600 may define cropping windows based in part on user input. For example, a key frame may be presented to a user after a scene change, who selects the ROI. The feature detector 620 may analyze the selected ROI to extract dominant features. The cropping of the following frames will then track these features. In such an embodiment, Kalman filtering or particle filtering can be used to work around distortion/occlusion events in image data.

Figure 8:
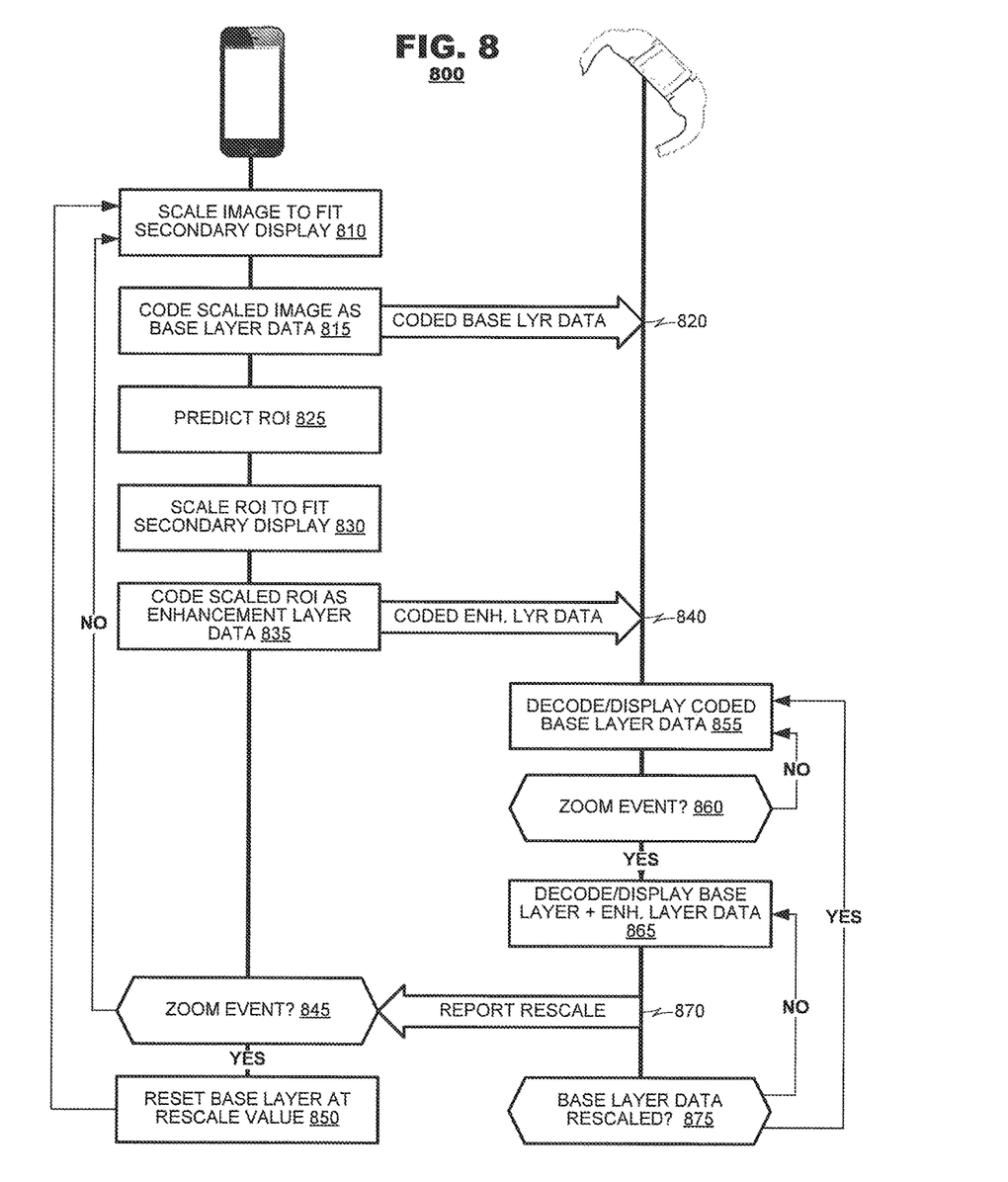
FIG. 8 illustrates a method according to an embodiment of the present disclosure.

FIG. 8 illustrates a method 800 according to an embodiment of the present disclosure. According to the method 800, a first terminal may scale an input image to fit a secondary display (box 810), code the scaled input image as base layer data (box 815) and transmit the coded base layer data to the second terminal (msg. 820). The method 800 also may predict an ROI from the image data (box 825), scale the ROI to fit the secondary display (box 830), code the scaled ROI as enhancement layer data (box 835) and transmit the coded enhancement layer data to the secondary terminal (msg. 840). The method 800 may perform the operations of boxes 810-835 until a zoom event occurs.

If a zoom event occurs (box 845), the method may reset the base layer image according to the display settings following the zoom event (box 850). The method 800 may return to box 810, where the method 800 may code base layer data according to the new settings (box 845) and predict new ROIs (box 825). The first terminal may continue operation of boxes 810-850 until interrupted by some other event, such as conclusion of the video coding operation.

According to the method 800, the secondary terminal may receive coded base layer data and coded enhancement layer data (msgs. 820, 840). The method may cause the secondary terminal to decode and display coded base layer data (box 855) until a zoom event occurs (box 860). When a zoom event occurs, the method may cause the second terminal to decode and display the base layer data and enhancement layer data (box 865). The method 800 also may cause the second terminal to report the zoom event to the first terminal (msg. 870).

The method 800 may cause the secondary terminal to decode and display the base layer data and enhancement layer data (box 865) until the base layer data is rescaled (box 875). Thereafter, the method 800 may return to box 855 and decode and display coded base layer data (now rescaled). The second terminal may continue operation of boxes 855-875 until interrupted by some other event, such as conclusion of the video coding operation.

Figure 9:
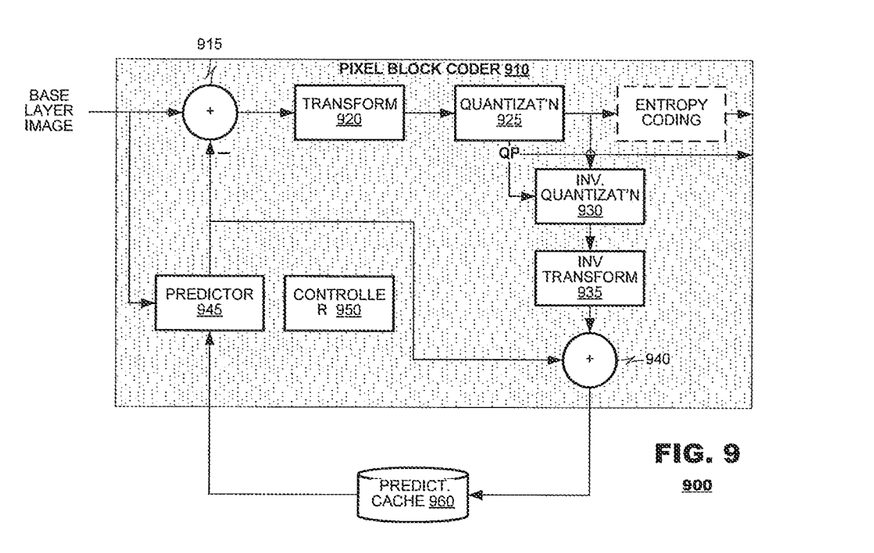
FIG. 9 illustrates a coding system according to another embodiment of the present disclosure.

FIG. 9 illustrates a coding system 900 according to another embodiment of the present disclosure. The system 900 may include a pixel block coder 910 and a prediction cache 960. The pixel block coder 910 may include a forward coding pipeline that includes a subtractor 915, a transform unit 920, and a quantizer 925, as well as other units to code pixel blocks of an input image (such as an entropy coder). The pixel block coder 910 also may include a prediction system that includes an inverse quantizer 930, an inverse transform unit 935, an adder 940 and a predictor 945. Operation of the pixel block coder 910 may be controlled by a controller 950.

The operation of coding units 915-950 typically is determined by the coding protocols to which the coder 910 conforms, such as H.263, H.264 or H.265. Generally speaking, the coder 910 may operate on a pixel block-by-pixel block basis as determined by the coding protocol to assign a coding mode to the pixel block and then code the pixel block according to the selected mode. When a prediction mode selects data from the prediction cache 960 for prediction of a pixel block from the input image, the subtractor 915 may generate pixel residuals representing differences between the input pixel block and the prediction pixel block on a pixel-by-pixel basis. The transform unit 920 may convert the pixel residuals from the pixel domain to a coefficient domain by a predetermined transform, such as a discrete cosine transform, a wavelet transform, or other transform that may be defined by the coding protocol. The quantization unit 925 may quantize transform coefficients generated by the transform unit 920 by a quantization parameter (QP) that is communicated to a decoder (not shown).

The pixel block coder 910 may generate prediction reference data by inverting the quantization, transform and subtractive processes for coded images that are designated to serve as reference pictures for other frames. These inversion processes are represented as units 930-940, respectively. Reassembled decoded reference frames may be stored in the prediction cache 950 for use in prediction of later-coded frames. The predictor 945 may assign a coding mode to each coded pixel block and, when a predictive coding mode is selected, outputs the prediction pixel block to the subtractor 915.

The system 900 of FIG. 9 may be used to provide multiresolution coding of video using single layer coding techniques. According to this embodiment, a controller 950 may alter transform coefficients prior to entropy coding according to frequency components of the image data being coded.

The foregoing discussion has described operation of the embodiments of the present disclosure in the context of coding systems and decoding systems provided within terminals. Commonly, these components are provided as electronic devices. They can be embodied in integrated circuits, such as application specific integrated circuits, field programmable gate arrays and/or digital signal processors. Alternatively, they can be embodied in computer programs that are stored in memory and execute on processing devices of personal computers, notebook computers, computer servers or mobile computing platforms such as smartphones and tablet computers. Similarly, decoders can be embodied in integrated circuits, such as application specific integrated circuits, field programmable gate arrays and/or digital signal processors, or they can be embodied in computer programs that are stored in memory and execute on processing devices of personal computers, notebook computers, computer servers or mobile computing platforms such as smartphones and tablet computers. Decoders commonly are packaged in consumer electronics devices, such as gaming systems, DVD players, portable media players, tablet computers, smartphones, smartwatches, virtual reality goggles, augmented reality goggles, automotive media system, aircraft media systems and the like. They also can be packaged in consumer software applications such as video games, browser-based media players and the like. And, of course, these components may be provided as hybrid systems that distribute functionality across dedicated hardware components and programmed general purpose processors as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A coding method, comprising:
converting input video to a resolution of a destination display,
base layer coding the converted video,
predicting a region of interest (ROI) from within the input video,
converting the predicted ROI to the resolution of the destination display,
enhancement layer coding the converted ROI; and
transmitting the coded base layer data and the coded enhancement layer data to the destination display.

2. The method of claim 1, further comprising,
responsive to an indication of a zoom event at the destination display, scaling the input video according to a parameter of the zoom event, and base layer coding the scaled input video.

3. The method of claim 1, wherein the predicting is performed by face detection within the input video.

4. The method of claim 1, wherein the predicting is performed by motion detection within the input video.

5. The method of claim 1, wherein the predicting is performed by complexity analysis of the input video.

6. The method of claim 1, wherein the predicting comprises:
identifying predetermined features within a sequence of the input video;
defining cropping windows for frames of the sequence to circumscribe the detected features spatially and temporally.

7. The method of claim 6, where the prediction further comprises:
estimating a coding cost of frame content of the detected features, and
increasing a size of the cropping windows based on the estimated coding cost.

8. The method of claim 1, wherein the input video is decoded data.

9. The method of claim 1, wherein the input video is camera data.

10. The method of claim 1, wherein one of the resolution conversions outputs video data in a format different from a format of the input video data.

11. The method of claim 1, further comprising filtering the input video prior to conversion.

12. The method of claim 1, further comprising determining output data rates for the base layer and enhancement layer coding based on content analysis of the input video and a target quality level.

13. A coding system, comprising:
a resolution converter having an input for video to be coded;
a base layer coder having an input coupled to an output of the resolution converter;
a region of interest (ROI) predictor having an input for the video to be coded;
a cropping unit having an input coupled to the ROI predictor,
an enhancement layer coder having an input coupled to the cropping unit; and
a syntax unit having inputs coupled to the base layer coder and the enhancement layer coder.

14. The system of claim 13, wherein the resolution converter:
converts a first field of view of input video to a resolution of a destination display, and
in response to a zoom event at the destination display, converts a second field of view of the input video to the resolution of the destination display.

15. The system of claim 13, wherein the ROI predictor performs face detection on the input video.

16. The system of claim 13, wherein the ROI predictor performs motion detection on the input video.

17. The system of claim 13, wherein the ROI predictor performs complexity analysis of content of the input video.

18. The system of claim 13, wherein the ROI predictor comprises:
a feature detector having an input for input video;
a mapping unit having an input coupled to the feature detector, wherein the mapping unit provides cropping windows to the cropping unit.

19. The system of claim 18, wherein the ROI predictor estimates coding cost of frame content of the modeled features, and increases a size of the cropping windows in response to the estimated coding cost.

20. The system of claim 13, further comprising a video decoder having an output for the input video data.

21. The system of claim 13, further comprising a video decoder having a camera having an output for the input video data.

22. The system of claim 11, wherein the base layer and enhancement layer coder each include pre-filters for input data and having outputs coupled respectively to inputs of their associated coders.

23. Non-transitory computer readable medium storing program instructions, that when executed by a processing device, cause the device to:
convert input video to a resolution of a destination display,
base layer code the converted video,
predict a region of interest (ROI) from within the input video,
convert the predicted ROI to the resolution of the destination display,
enhancement layer code the converted ROI; and
transmit the coded base layer data and the coded enhancement layer data to the destination display.

24. A decoding method, comprising:
receiving coded base layer data and coded enhancement layer data, the coded base layer data representing video in a field of view, and the coded enhancement layer representing video of a predicted region of interest associated with the field of view,
initially decoding and displaying the coded base layer data; and
in response to a zoom event, decoding and displaying the coded base layer data and the coded enhancement layer data.

25. The method of claim 24, further comprising, also in response to the zoom event:
transmitting a notice of the zoom event to a source of the coded base layer data and the coded enhancement layer data, and
when content of the coded base layer data is rescaled:
terminating decoding of the coded enhancement layer data and
continuing decoding and displaying of the coded base layer data.

26. A decoding system, comprising: a display,
a base layer decoder having an input for coded base layer data representing video in a field of view,
an enhancement layer decoder having an input for coded enhancement layer data representing video of a predicted region of interest associated with the field of view,
a controller that:
causes the display to render decoded base layer data in a first mode of operation, and
causes the display to render decoded base layer data and decoded enhancement layer data in a second mode of operation, which is engaged in response to a zoom event.

27. The system of claim 26, wherein the controller, also in response to the zoom event:
causes a notice of the zoom event to be transmitted to a source of the coded base layer data and the coded enhancement layer data, and
when content of the coded base layer data is rescaled, causes the display to cease display of decoded enhancement layer data.

28. Non-transitory computer readable medium storing program instructions, that when executed by a processing device, cause the device to:
receive coded base layer data and coded enhancement layer data, the coded base layer data representing video in a field of view, and the coded enhancement layer representing video of a predicted region of interest associated with the field of view,
decode and display the coded base layer data; and
in response to a zoom event, decode and display the coded base layer data and the coded enhancement layer data.

* * * * *